July 21, 1959  J. H. REED III  2,895,412
PRINTING APPARATUS
Filed April 1, 1958  8 Sheets-Sheet 1

INVENTOR.
James H. Reed, III
BY
HIS ATTORNEYS

INVENTOR.
James H. Reed, III
BY Webb, Mackey & Burden
HIS ATTORNEYS

July 21, 1959

J. H. REED III 2,895,412

PRINTING APPARATUS

Filed April 1, 1958

INVENTOR.
James H. Reed, III

BY Webb, Mackey & Burden
HIS ATTORNEYS

July 21, 1959

J. H. REED III 2,895,412

PRINTING APPARATUS

Filed April 1, 1958

INVENTOR.
James H. Reed, III
BY Webb, Mackey & Burden
HIS ATTORNEYS

INVENTOR.
James H. Reed, III

HIS ATTORNEYS

July 21, 1959  J. H. REED III  2,895,412
PRINTING APPARATUS
Filed April 1, 1958
8 Sheets-Sheet 7
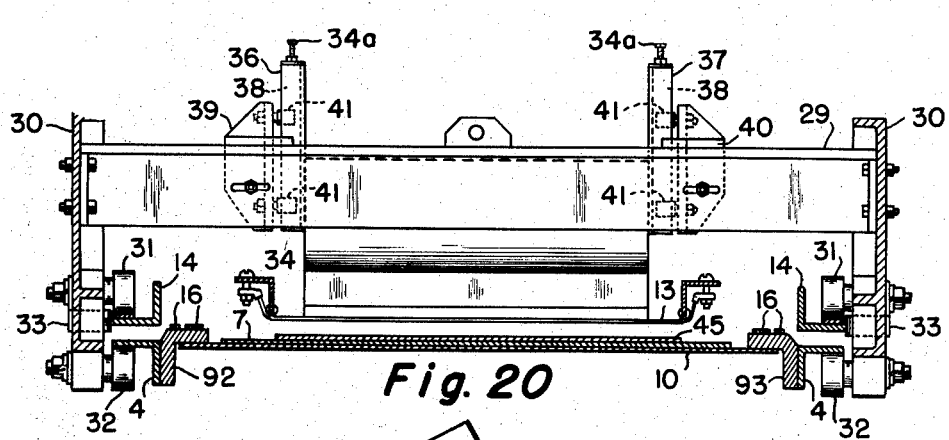
Fig. 20
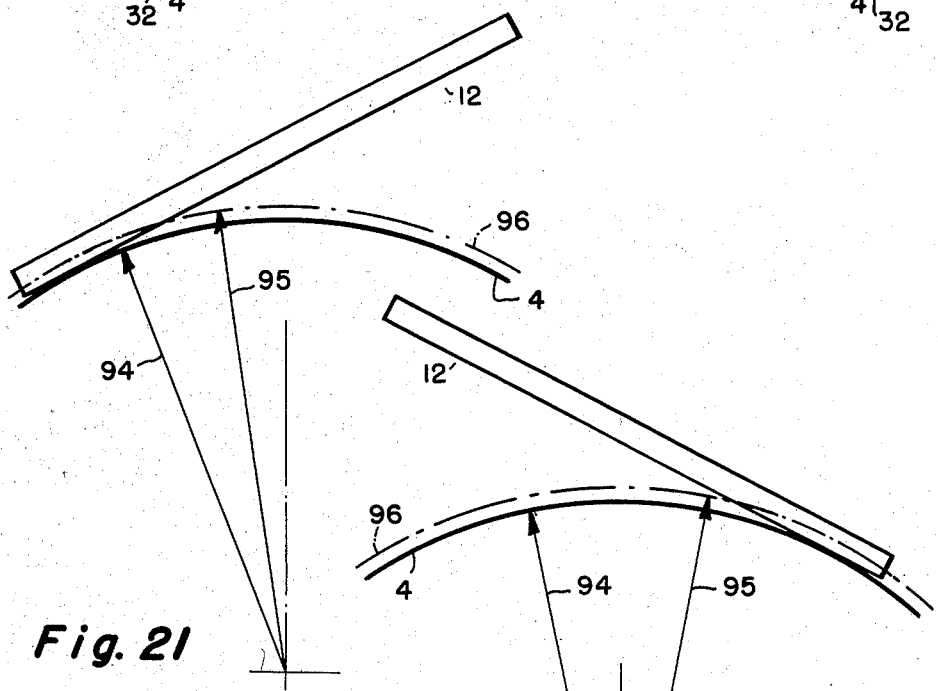
Fig. 21
Fig. 22
INVENTOR.
James H. Reed, III
BY
HIS ATTORNEYS

United States Patent Office 2,895,412
Patented July 21, 1959

2,895,412

PRINTING APPARATUS

James H. Reed III, Pittsburgh, Pa., assignor to Dry Screen Process, Inc., Pittsburgh, Pa., a corporation of Pennsylvania Application April 1, 1958, Serial No. 725,757

10 Claims. (Cl. 101—123)

This application is a continuation in part of my application Serial No. 605,038, filed August 20, 1956, now abandoned.

This invention relates to printing apparatus and, more particularly, to screen printing machines in which a printing composition is forced through a screen onto stock to be printed by a squeegee or similar element moved across the screen. In screen printing, the screen, which may be wire mesh or a fabric made from various kinds of fibers, is stretched tightly upon a frame. On the screen is a stencil comprising a design, printed matter, or a combination thereof and formed by rendering parts of the screen impervious to passage of the printing composition therethrough. The stock to be printed is placed beneath the screen and the screen is then moved down into contact with or down to a small distance above the stock to be printed. Generally, the stock is paper, cardboard, plastic or metal sheets.

My machine is particularly well adapted for the so-called "hot color" process of printing themoplastic inks. In the "hot color" process, the ink dries immediately as it is printed on the stock or material which, therefore, comes off the press perfectly dry, ready for delivery or for additional printing. The color or printing composition is heated before being fed onto a screen to impart a proper viscosity to the painting composition so that it may be easily applied to the stock without fouling or clogging the screen. The screen is heated to maintain the printing composition in a molten state and, when the composition is applied to the relatively cooler printing surface of the stock, it instantly solidifies into a thin, perfectly dry film before the stock can be removed or ejected from the press.

Heretofore, the use of these thermoplastic inks has been limited to the printing of relatively crude work, primarily because of the difficulty of separating the screen from the stock after the ink has been deposited on the stock. Another difficulty has been the preheating of the paper stock by the hot screen and the heating of the ink by the screen after printing so that the ink has not dried as quickly as desired. I have invented a screen printing machine epecially suited for printing with thermoplastic inks which solves these difficulties. My machine brings the stock and the screen together so that they move adjacent each other, only a narrow area extending across the width of the stock, which area is so small as to be almost a line contact. In this area, ink is forced through the screen onto the stock. The result is that the stock is not heated by being close to the hot screen before printing and the stock is separated from the screen immediately after the ink has been forced through the screen onto the stock. Fine printing work can be done with thermoplastic inks and all the other advantages of such inks can be obtained.

My machine comprises two members, a bed adapted for supporting stock to be printed and a frame which houses the screen and upon which the screen is tautly stretched. The frame is mounted adjacent the bed so that the screen is adapted for delivering a printing composition onto the stock. Either the frame or the bed is longitudinally curved and the opposite member is substantially flat. Both the frame and the bed have guideways extending longitudinally thereof, the guideways of the curved member having a longitudinal curvature and the guideways of the flat member being substantially flat. Mounted upon the guideways of both the frame and the bed is a carrier adapted to move back and forth along the guideways of both the frame and the bed. Movement of the carrier along the guideways of both the frame and the bed causes the flat member to rock upon the curved member. The carrier is adjacent the point at which the flat member rocks on the curved member and carries a squeegee which forces the printing composition through the screen onto the stock to be printed at the point where they are closest together.

In the accompanying drawings, I have shown preferred embodiments of my invention, in which:

Figure 20 is a section similar to Figure 3 and showing a modification of the apparatus shown in Figures 1 to 3;

Figures 21 and 22 are diagrams illustrating the action of the modification shown in Figure 20;

Figure 1:
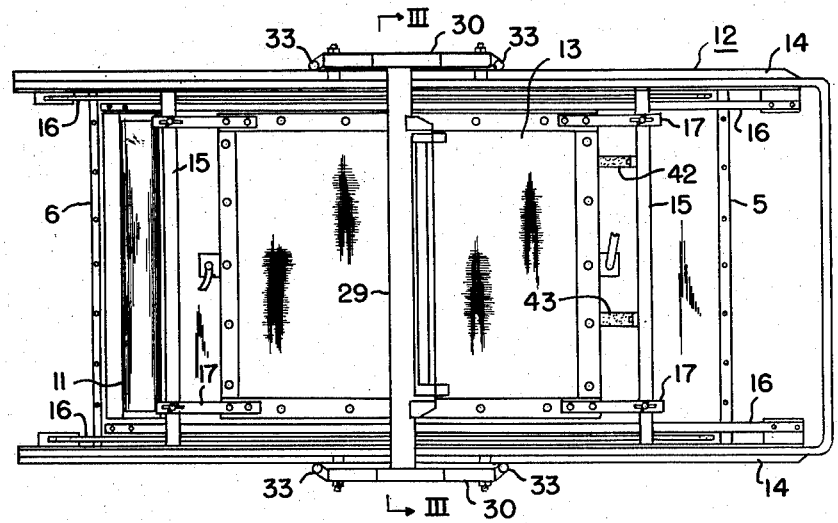
Figure 1 is a plan view of one embodiment of my screen printing apparatus.
Figure 2:
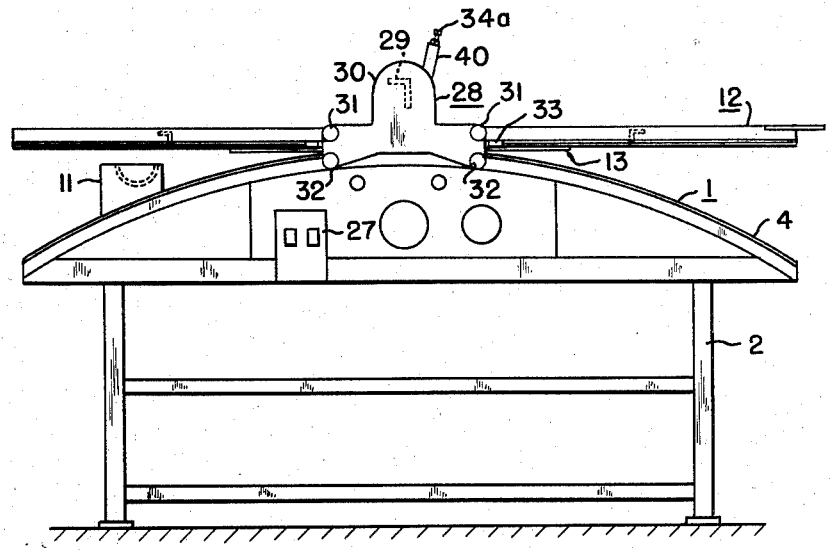
Figure 2 is a side elevation view of the apparatus of Figure 1.
Figure 3:
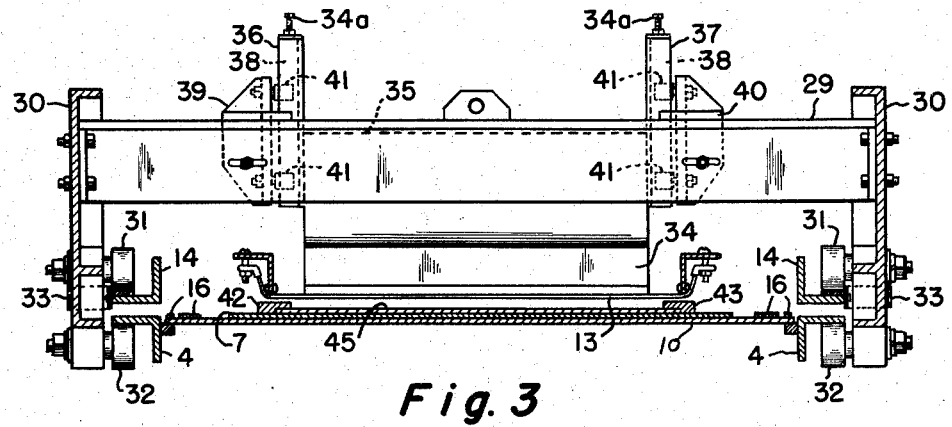
Figure 3 is a section view along the line III—III of Figure 1.

As shown in Figures 1, 2, 3, and 5, my apparatus comprises a bed 1 mounted upon a stand 2 and having a framework 3 made from two longitudinally disposed guideways or tracks 4 held apart and held in substantially parallel relationship to one another by a pair of cross bars 5 and 6. Figures 1, 2, and 3 show that the guideways are angle members.

Figure 5:
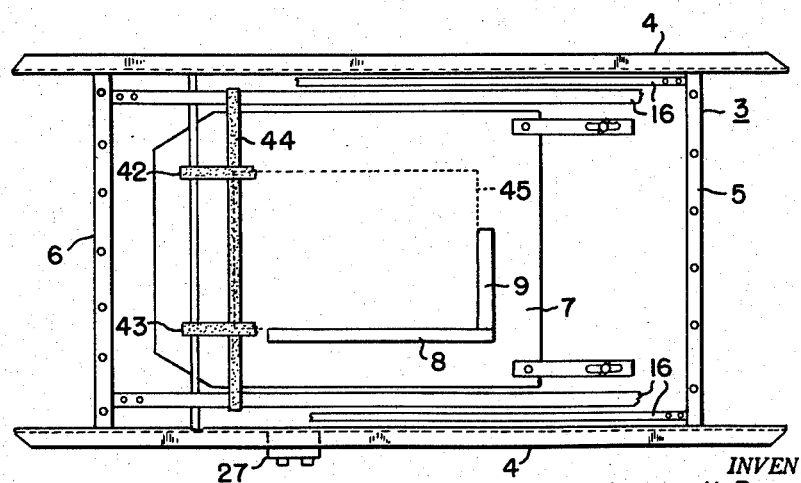
Figure 5 is a plan view of the assembled bed.

As shown in Figure 5, the framework houses a registration board 7 on which are a pair of index tapes 8 and 9 set at right angles to one another. The registration board receives and supports the stock to be printed, such as paper, cardboard and plastic or metal sheets, and the index tapes 8 and 9 enable one to properly position the stock to be printed on the registration board. Specifically, I set a sheet of paper so that one corner fits into and coincides with the two index tapes. To support the registration board, I provide cross strips 10 (Figure 3) which extend transversely between the guideways and under the registration board.

Figure 10:
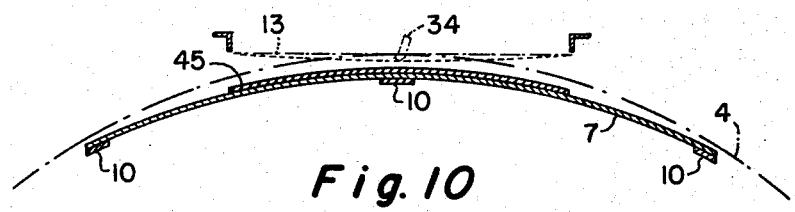
Figure 10 is a schematic diagram showing the curvature of the guideway and of the bed.

As shown in Figures 2 and 10, part of the bed including the guideways and registration board has a longitudinal curvature with the curvature of the guideways being slightly different from that of the registration board.

Mounted upon the left-hand part of the registration board, viewing Figure 2, is a receptacle or reservoir 11 for the printing composition. This reservoir has conventional electric resistance heating elements (not shown) embodied therein for heating the thermoplastic printing composition to a desired temperature.

Disposed above the bed 1 and mounted thereon is a substantially flat frame 12 which carries a screen 13 through which the printing composition is forced down onto stock placed upon the registration board. The frame 12 comprises two guideways or tracks 14 made from angles which form the frame sides and a pair of cross bars 15 each positioned between the guideways 14.

Figure 4:
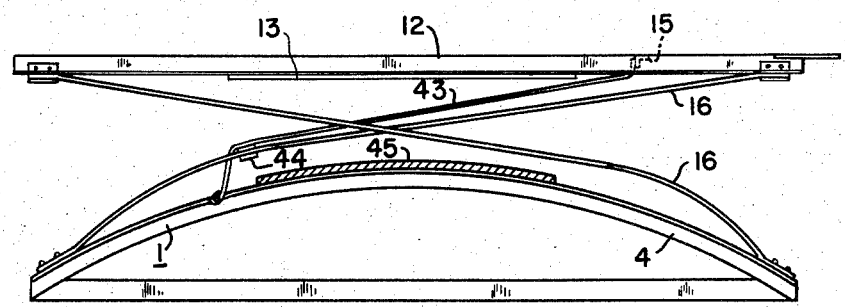
Figure 4 is a schematic diagram showing the frame, bed, and a device for preventing the material to be printed from sticking to the screen.
Figure 6:
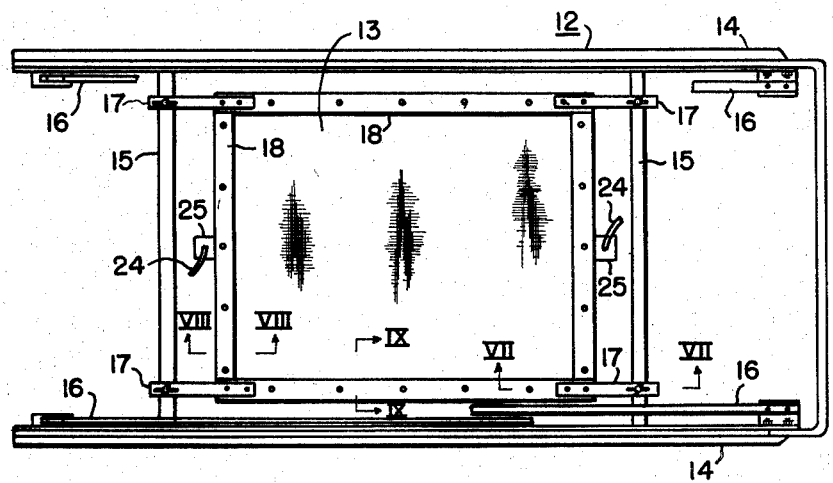
Figure 6 is a plan view of the frame and screen.
Figure 7:
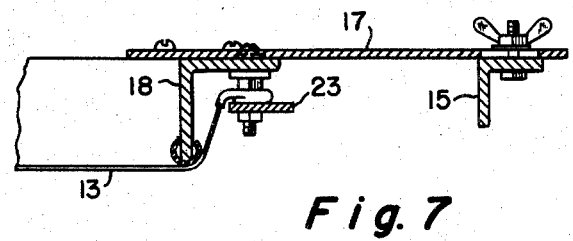
Figure 7 is a section view along the line VII—VII of Figure 6.

Figures 4 and 6 illustrate a means of mounting the frame 12 upon the bed 1. I provide two pairs of bands 16 made from flexible metal strip and adapted to hold the frame in a desired position upon the bed while, at the same time, permitting the frame to rock upon the bed as described more fully hereinafter. Both pairs of bands are similarly arranged between the frame and the bed along the guideways of the frame and of the bed with one pair of bands being disposed along one side of the apparatus and the other pair along the opposite side of the apparatus. As to each pair of bands, each band is diagonally disposed between the frame and the bed with one band occupying one diagonal therebetween and the other band the other diagonal. Each band has one end secured to one end of the guideway of the frame and the other end secured to the opposite end of the guideway of the bed.

The cross bars 15 in combination with mounting tabs 17 provide a floating bar support for the screen 13, preferably made from stainless steel cloth. Stainless steel cloth is desirable because its relatively high electrical resistance enables the screen to serve as its own heating element. Generally, 165 mesh 18–8 stainless steel cloth woven from .0019 wire provides fine enough detail for all practical requirements, but finer mesh up to 230 mesh may be used where better detail is desired.

Figure 8:
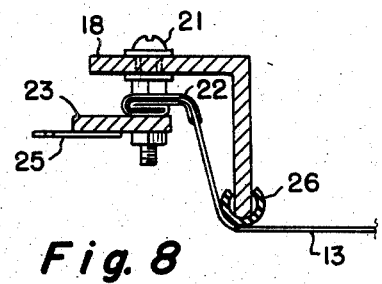
Figure 8 is a section view along the line VIII—VIII of Figure 6.
Figure 9:
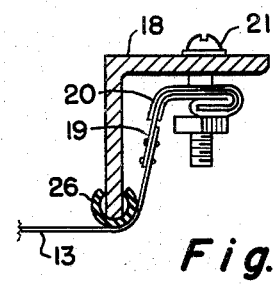
Figure 9 is a section view along the line IX—IX of Figure 6.

An angle bar 18 supported by the dielectric tabs 17 from the bars 15 (Figures 6, 8, and 9) carries the screen 13 with the sides of the stainless steel cloth machine stitched to intervening strips 19 of light canvas or duck which, in turn, is crimped into strips 20 of galvanized angle for drawing the screen taut upon the angle bar frame 18 by adjustment of bolts 21 (Figure 9). At the ends of the screen, the stainless steel cloth is soldered to crimped galvanized angle strips 22 which are, in turn, bolted to aluminum bus bars 23 (Figure 8). These aluminum bus bars deliver a low voltage, high amperage heating current to the screen from a power source connected to the bus bars through cables 24 joined to straps 25 in turn soldered to the bus bars 23.

Preferably, the angle bar frame is made of aluminum since the expansion of aluminum is slightly greater than that of the stainless steel cloth when both are heated, thus not only maintaining but slightly increasing tautness of the screen when it is heated. A rubber grommet 26 located around the perimeter of the bottom inside edge of the angle bar frame over which the screen is stretched insulates the screen from this frame.

For good results, it is desirable that the screen be held at a relatively finely controlled temperature slightly above the melting point of the printing composition employed. To so control the temperature of the screen, I pass a controlled low voltage, variable high amperage current through the screen. The preferred printing temperature is one slightly above the melting point of the composition and is obtained by setting a current regulator within 5 amperes above the current required to melt the composition. At such a setting of the screen current, the thermoplastic printing composition has the proper viscosity to effect sharp and clear printings when forced through the screen by the squeegee. The desired current and voltage are obtained from a conventional control 27 mounted beneath the bed 1 on the support 2. This control also regulates the temperature of the composition in the receptacle 11.

The squeegee is mounted on a carrier 28, made from an angle bar 29 having an end member 30 secured to each end, each end member being mounted upon the guideways of both the bed and the frame so that the carrier straddles the screen housed in the frame 12. Each end member 30 of the carrier has mounted thereon a pair of rollers 31 which engage and move along the guideways of the frame and a second pair of rollers 32 which engage and move along the guideways of the bed. At each end of each end member is a roller 33 vertically mounted thereon which engages and travels along the outer edge of the lower arm of the angle guideways of the frame.

Figure 14:
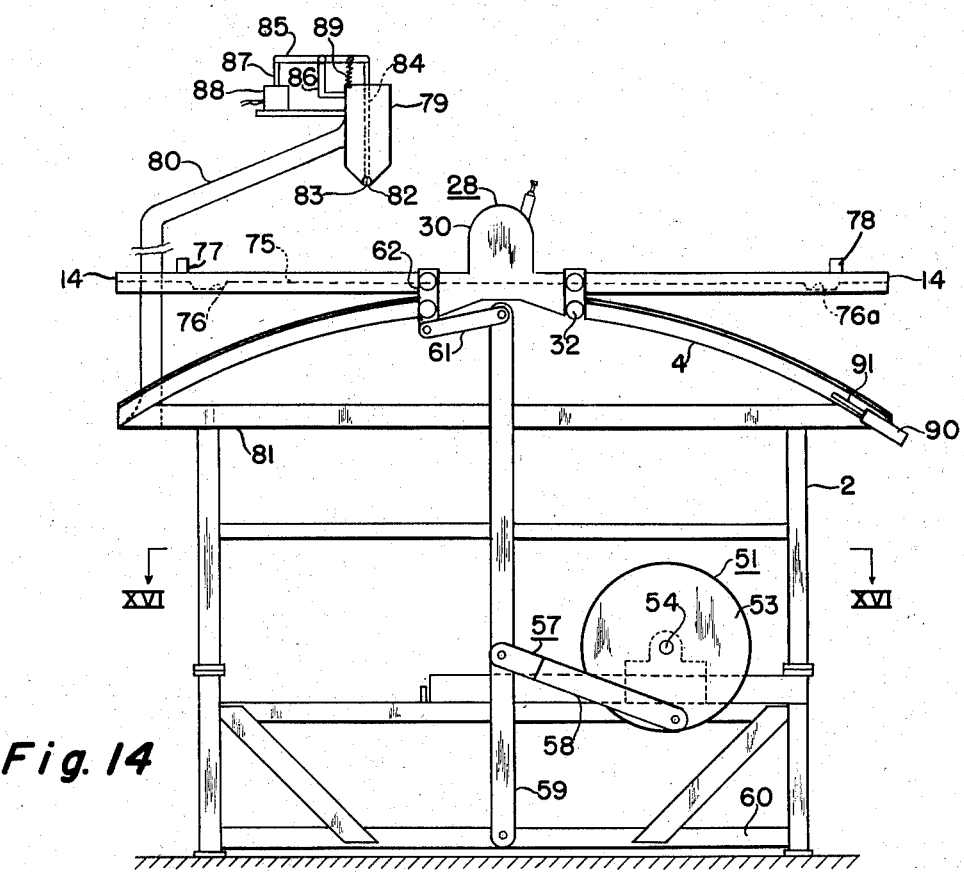
Figure 14 is a side elevation view of a third embodiment of my invention.

As shown in Figures 2 and 14, the carrier 28 travels from one end of the guideways to the other. Since the upper rollers 31 of the carrier travel along the substantially flat guideways of the frame and since the lower rollers 32 of the carrier travel along the curved guideways of the bed, movement of the carrier upon the guideways rocks the flat frame upon the curved bed. In other words, as the carrier travels along the guideways, it positions the frame 12 at an angle substantially tangent to that part of the guideways of the bed which the carrier rollers engage at a given instant. Referring to Figure 2, with the carrier at the left-hand part of guideways 14 of the frame and 4 of the bed, the frame 12 is substantially tangent with the lower left-hand part of the guideways of the bed. When the carrier is located about midway between the ends of the guideways of the bed and of the frame (Figures 2 and 14), the frame 12 is substantially tangent to the center of the bed guideways 4.

To force the printing composition through the screen, I use a squeegee 34 carried upon the angle bar 29 of the carrier 28. The squeegee 34 extends substantially across the width of the screen and moves over the screen in contact therewith as the carrier travels from left to right along the guideways viewing Figure 2.

As shown in Figure 3, the squeegee is set in a holder 35 which is secured between two posts 36 and 37, each of which has a vertical slot 38. The squeegee 34, holder 35, and the two posts 36 and 37 are mounted upon two brackets 39 and 40 secured to the angle bar 29. Each bracket has two rollers 41 mounted thereon with the rollers of one bracket fitting into the slot of one of the posts and with the rollers of the other bracket fitting into the slot of the other post so that the squeegee and posts may be raised and lowered upon the angle bar 29. As shown in Figure 2, the rollers are so mounted upon the brackets 39 and 40 that the squeegee is set at an angle to a plane normal to the screen 13.

To prevent the stock to be printed from sticking or adhering to the screen 13 after printing and to provide easy and efficient peeling away of the stock from the screen, I employ straps 42 and 43. These straps preferably are made from a resilient material such as rubber, synthetic rubber, or any other suitable material and are maintained under a light tension. As shown in Figures 1 and 4, these straps have one end connected to the cross bar 15 of the frame 12 and the other end connected to the bed 1 at the left-hand end thereof. Strap 42 engages one side of the stock to be printed and strap 43 engages the other side of the stock disposed upon the registration board.

After a sheet of material has been placed upon the registration board and the carrier 28 has moved from its extreme left-hand position to the right, the straps are forced down upon the edges of the material and not only prevent the stock from adhering or sticking to the screen but also cooperate with the index strips to hold the material in a desired position. To separate the straps from the paper, a separating strip 44 is placed between two bands 16, one on each side of the apparatus, with its ends connected thereto. As shown in Figure 4, the separator strip is positioned so that it is beneath the straps 42 and 43, thereby lifting the straps from the stock as the carrier travels to the right on the guideways and the frame 12 rocks upon the bed 1.

Preferably, I employ my apparatus in off-contact printing, but it may also be employed in contact printing. For off-contact printing, it is essential that, when the squeegee travels across the center of the screen 13, the screen is not forced down into contact with the stock. Since the screen has a certain amount of give, particularly at its center part, when the squeegee, in contact with the screen during a printing stroke, reaches the center part of the screen, it depresses the center part a greater amount than it depresses other parts of the screen (Figure 10). To compensate for this greater amount of depression at the center of the screen and to insure off-contact printing, I made the radius of curvature of the guideways 4 of the bed different from the radius of curvature of the bed itself. As shown in Figure 10, the curvature of the bed is greater than that of the guideways so that, when the carrier is at the center of the bed and frame and the squeegee is in contact with the screen, the screen, while depressed, is out of contact with the stock 45. I have obtained good results in off-contact printing with a taut screen when average clearance is 3/16" from screen to surface of the stock.

Operation of the apparatus of Figures 1, 2, 3, and 5 comprises five steps: (1) With the carrier in the extreme left-hand position, the operator inserts stock to be printed upon the registration board and positions it to coincide with the index tapes 8 and 9. (2) The squeegee is inserted in the receptacle 11, then raised clear therefrom and allowed to drop to the left-hand end of the screen (viewing Figure 1), thereby depositing an amount of printing composition sufficient to fully cover the screen in a single stroke thereacross. It is important that the amount of composition deposited upon the front of the screen by the squeegee be sufficient for adequately covering the entire screen in one printing stroke; otherwise, the printed stock is unsatisfactory. (3) The operator applies a pressure downwardly upon the squeegee to the fullest extent permitted by a pressure adjustment 34a and moves the carrier and squeegee from the left-hand end of the apparatus to the right maintaining at all times the squeegee in contact with the screen and thus printing the stock (4) The operator raises the squeegee up off of the screen and returns the carrier and squeegee to the starting position. (5) The printed stock is lifted off the board.

Figure 11:
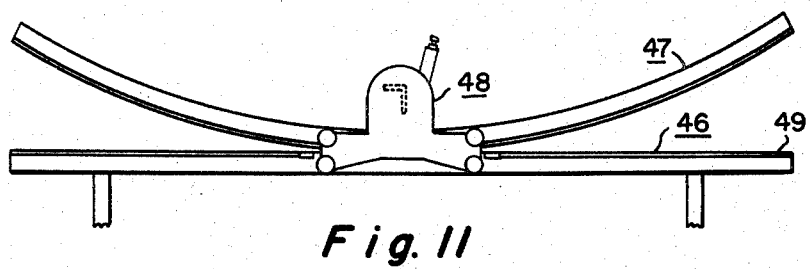
Figure 11 is a side elevation view of a modification of my apparatus.
Figure 12:
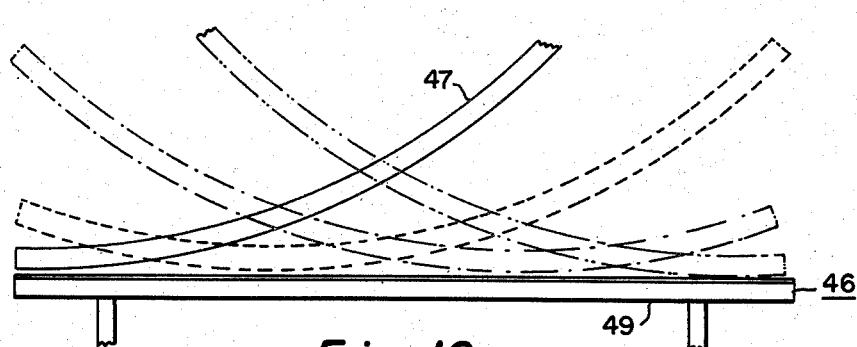
Figure 12 is a schematic view of the curved member of the apparatus of Figure 11 in various positions.
Figure 13:
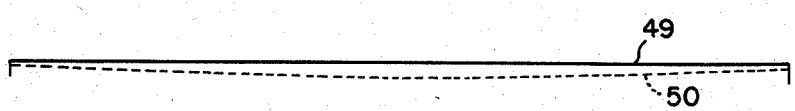
Figure 13 is a schematic view showing the guideways and bed of the apparatus of Figure 11.

Figures 11, 12, and 13 show a modification of my invention in which the bed 46 is substantially flat while the frame 47 is curved longitudinally. Both the bed 46 and the frame 47 have guideways comparable to those of bed 1 and frame 12 and a carrier 48 identical to the carrier 28. The carrier 48 rides upon the guideways of both the frame and the bed and, in so doing, rocks the frame upon the bed in the same way that carrier 28 rocks frame 12 upon curved bed 1 except that, in this embodiment, a curved frame is rocked upon a flat bed. Figure 12 shows the various positions occupied by the curved frame as it is rocked upon the flat bed by travel of the carrier along the guideways.

Figure 13 shows the disposition of the guideways 49 of the bed 46 relative to the top 50 of the bed itself whereby off-contact printing may be carried out. As shown, the guideways are substantially flat while the top of the bed has a slight concave curvature wherein the distance between the top of the bed and the top of the guideways is greater at the center of the bed than at the ends thereof. Such a disposition of the guideways relative to the bed allows for a greater amount of depression in the center of the screen by the squeegee and insures that the screen does not contact the material during a printing stroke.

The operation of this modification of my apparatus is substantially the same as that of the apparatus previously described, taking into account, of course, the difference in contour between the frame and the bed.

Figure 15:
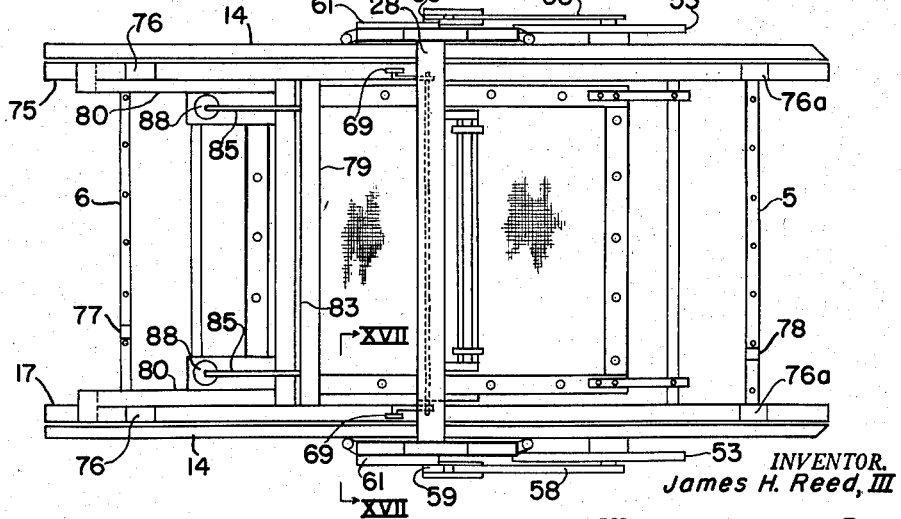
Figure 15 is a plan view of the apparatus of Figure 14.
Figure 16:
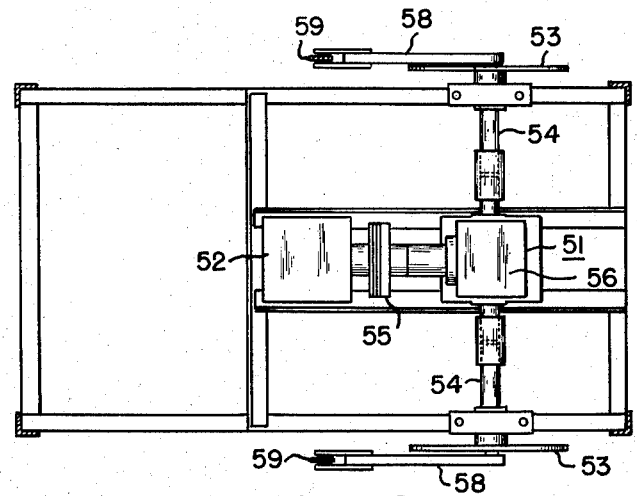
Figure 16 is a section view along the line XVI—XVI of Figure 14.

Figures 14, 15, and 16 show another modification of my apparatus wherein the carrier is automatically moved back and forth along the guideways by a drive mechanism 51 and wherein, during movement along the guideways, the squeegee 34 is lowered down into contact with the screen 13 for the printing stroke and is raised up off of the screen for the return stroke. The drive mechanism 51 comprises a motor 52 which drives a pair of face plates 53, one located on each side of the apparatus and which are keyed upon shafts 54. Motor 52 drives the shafts 54 through a clutch and brake mechanism 55 and a right angle drive 56 connected to the shafts. To impart a reciprocating motion to the carrier 28 along the guideways, I employ on each side of my apparatus a linkage structure 57 which connects the driven face plates 53 to the carrier 28.

The linkage structure 57 comprises a connecting lever 58 having one end pivotally joined to face plate 53 at a point adjacent its periphery and having its other end pivotally joined to a vertically disposed rod 59 at a point near its lower end. The lower end of the rod 59 is pivoted to a bottom bar 60 of the stand 2 which supports the bed of my apparatus. The upper end of the rod is pivotally connected to one end of a cross member 61 whose other end is pivotally connected to a vertical arm 62 secured to one end member 30 of the carrier 28. Rotation of face plate 53 imparts an oscillating motion to the rod 59 connected to the face plate through the connecting lever 58. The oscillating motion of the rod 59 moves the carrier 28 back and forth along the guideways of both the bed and the frame.

Referring to Figure 14, as face plate 53 turns in a clockwise direction, it, acting through connecting lever 58, pushes the rod 59 to the left which, in turn, causes carrier 28 to travel to the left. As shown in Figure 14, pushing the carrier 28 to the left is a part of the return stroke of the apparatus. As the face plate 53 continues to rotate in a clockwise direction, it, acting through connecting lever 58, pulls rod 59 to the right, thus moving the carrier 28 along the guideways of the bed and frame to the right, viewing Figure 14. Travel of the carrier 28 to the right along the guideways comprises the printing stroke of the apparatus shown in Figure 14.

The structure shown in Figures 14, 15, and 16 has a mechanism 63 which automatically lowers the squeegee 34 down into engagement with the screen 13 at the beginning of the printing stroke and maintains the squeegee in contact with the screen throughout the printing stroke. This mechanism also automatically raises the squeegee up off of the screen at the start of the return stroke and holds it up off of the screen throughout the return stroke. This mechanism 63 is a linkage arrangement of which there is one on each side of the carrier 28. The mechanism comprises a vertically disposed curved arm 64 having its upper end connected to squeegee holder 65 and its lower end pivotally joined to an arm 66 of an L-shaped lever 67. The other arm 68 of lever 67 carries a cam roller 69 and the lever 67 is pivotally mounted at the intersection of branches 66 and 68 upon a gusset plate 70 secured to angle bar 29 of the carrier.

In the embodiment of Figures 14, 15, and 16, the squeegee 34 and its holder 65 are mounted between two vertical posts 71 rigidly secured to bracket 72 connected to angle bar 29. Each post has a vertical slot 73 into which rollers 74 extending from the squeegee holder 65 fit so that the squeegee and its holder may be lowered into contact with the screen 13 and raised up off of the screen 13.

Figure 17:
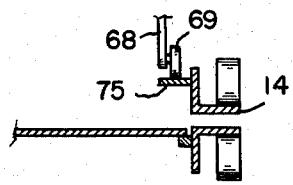
Figure 17 is a section view along the line XVII—XVII of Figure 15.

As shown in Figures 14, 15, and 17, I provide a cam way 75 for the cam roller 69 along the inner side of guideways 14 of the frame 12. The cam way has two depressions 76 and 76a, one adjacent each end thereof which cooperates with mechanism 63 for lowering the squeegee down into engagement with the screen for the printing stroke or for raising the squeegee up off of the screen for the return stroke.

Figures 18, 19:
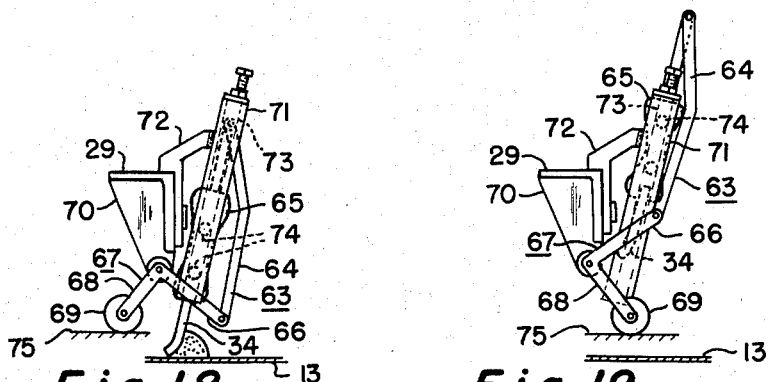
Figures 18 and 19 are side elevation views showing the squeegee of Figure 14 and a linkage arrangement for raising and lowering the squeegee.

Figure 19 shows the position of the cam roller and the squeegee during the return stroke with the squeegee raised up off of the screen and Figure 18 shows the position of the cam roller and squeegee during the printing stroke. As shown in Figure 18, the cam way 75 is higher than the screen 13.

The mechanism 63 in combination with the depressions 76 and 76a lowers the squeegee down into engagement with the screen when the carrier 28 reaches stop 77 positioned upon cross bar 6. Lowering of the squeegee occurs when, with the cam roller 69 in depression 76, the carrier 28 starts to travel to the right, viewing Figure 14, whereupon the lever 67 pivots in a clockwise direction (see Figure 18), thereby causing curved arm 64 to pull the squeegee 34 and its holder 65 downwardly into engagement with the screen with the rollers 74 of the holder riding in the vertical slot of the post 71.

When the carrier reaches the right-hand end of guideways 14, the cam roller there enters depression 76a and, upon start of travel of the carrier 28 to the left, the cam roller, in moving up out of depression 76a, causes lever 67 to pivot in a counterclockwise direction. As lever 67 pivots in a counterclockwise direction, arm 66 thereof pushes curved arm 64 upwardly, thereby raising the squeegee up out of contact with the screen 13 for the return stroke with the squeegee holder moving upwardly on rollers 74 in the vertical slot of the post 71.

The machine shown in Figure 14 has a reservoir 79 in which a printing composition is held and heated to the proper temperature for the printing operation. The reservoir 79 is supported above the screen by two brackets 80, one at each end of the reservoir, which are secured to flat longitudinal members 81 which extend across the top of the stand 2 beneath the guideways 4 and to which the guideways 4 are secured at their ends. The reservoir has converging sides adjacent its bottom which form an opening 82 in the bottom which extends across the width of the reservoir. A rod 83 controls the flow of composition through this slot. It is carried by two rods 84, one at each end, each of which in turn is pivotally connected to a lever 85 pivoted at its center on a bracket 86. The other end of the lever 85 is pivotally connected to an armature 87 of a solenoid 88. The action of the solenoids is to raise the rod 83 to permit ink to flow through the opening 82. The rod is pulled down to close the opening by a spring 89.

Power to the solenoids 88 is controlled by a switch 90 mounted on the end of the track 4 just beyond the path of movement of the carriage on the track. The switch 90 has a spring-loaded plunger 91 which is engaged by the roller 32 on the carriage 28 before the carriage ends its printing stroke. As soon as the roller 32 strikes the plunger 91, the switch 90 is closed to actuate the solenoids 88 and thereby lift the rod 83. The spring loading of the plunger 91 permits the carriage 28 to complete its stroke while keeping the switch 90 closed and the switch remains closed for a predetermined time during the return stroke of the carriage. When the roller 32 moves out of engagement with the plunger 91 on the return stroke of the carriage, the switch 90 opens and the spring 89 forces the rod 83 down to close the opening 82.

I have found that, where extremely accurate printing is required, it is necessary to compensate for the thermal expansion of the screen when it is brought up to the proper heating temperature. My apparatus is very useful in the manufacture of printed circuits, which are made by printing on a copper foil backed with an impervious insulating material a representation of the desired circuit in an ink which is resistant to an etching solution. After printing, the composite foil and insulation is etched, removing all of the copper foil except that protected by the acid-resistant material. Extreme accuracy is required in the printing of the acid-resistant material and this accuracy cannot be achieved unless thermal expansion of the screen is compensated for, even though that expansion is very slight, being in the neighborhood of .0015 inch in every inch of screen length.

Figures 20 to 25, inclusive, illustrate modifications to the apparatus shown in the earlier figures whereby compensation for thermal expansion of the screen is provided. Referring to Figure 20, angles 92 and 93 are affixed to the tracks 4 so that one flange of each angle extends horizontally and inwardly. The angles 92 and 93 extend substantially the full length of the tracks 4 and are curved about the same center as the tracks 4, the registration board 7, and the stock 45 which is to be printed (in this instance, metal foil backed with an impervious insulating material). The bands 16 which hold the frame to the bed while the frame rocks on the bed are curved against the inwardly extending flanges of the angles 92 and 93 as the frame is rocked on the bed. It will be noted, however, from Figure 20 that, while the bands 16 are curved by the angles 92 and 93 about the same center as the stock 45, the radius of the arc formed by the bands 16 is greater than the radius of the arc formed by the stock 45.

The effect of the bands in curving about an arc of larger radius than that of the arc formed by the stock is illustrated by the diagrams, Figures 21 and 22, Figure 21 showing the frame at the start of a printing stroke and Figure 22 showing the frame at the end of a printing stroke. In these diagrams, the radius of the arc formed by the tracks 4 is indicated by the line 94 and the radius of the arc formed by the bands 16 is indicated by the line 95. When the frame moves from the position shown in Figure 21 to the position shown in Figure 22, the frame is held by the carrier 28 so that it follows the arc formed by the tracks 4, but the carrier 28 permits it to move lengthwise relative to the bed. The bands 16, however, curve about an arc indicated by the chain lines 96 which has a radius 95 greater than the radius 94 of the arc of the tracks 4. Since the bands 16 are secured at their ends to the frame and to the bed, the bed 12 slides backwardly on the tracks 4 a distance equal to the linear difference in the arc formed by the tracks 4 and the arc 96 followed by the bands 16. By adjusting the difference between the radii 94 and 95, the frame 12 can be pulled back by the bands 16 a sufficient amount to compensate for thermal expansion of the screen.

Figure 23:
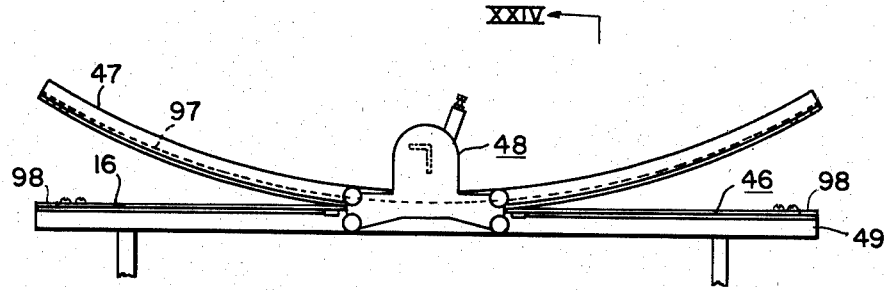
Figure 23 is a side elevation view showing a modification of the apparatus shown in Figure 11.
Figure 24:
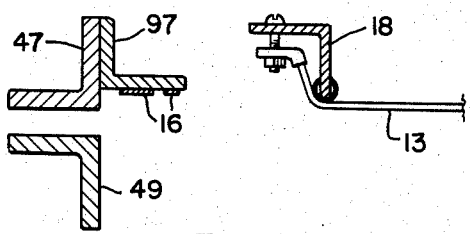
Figure 24 is a partial section along the line XXIV—XXIV of Figure 23.
Figure 25:
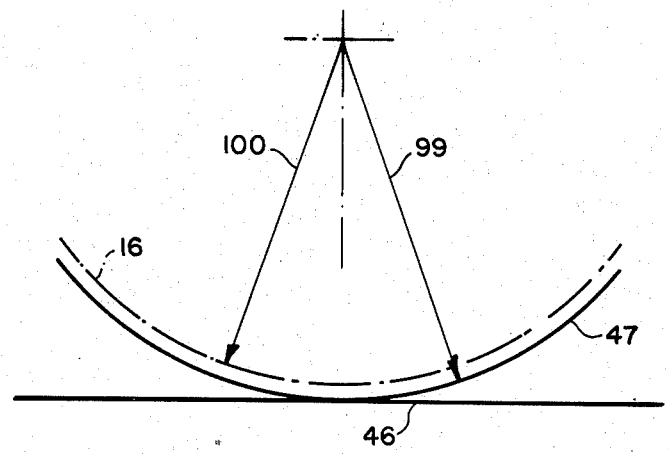
Figure 25 is a diagram illustrating the action of the modification shown in Figures 23 and 24.

Figures 23 to 25, inclusive, illustrate a modification of the apparatus shown in Figures 11 and 12 in which a flat bed and a curved screen are used. As shown in Figure 24, angles 97 are secured to the tracks on the frame 47, the angles 97 having one flange extending horizontally and inwardly. Bands 16 secured to the bed by blocks 98 and to the opposite ends of the frame 12 rest on the inwardly extending flanges of the angles 97. The angles 97 are parallel to the frame 47, extend substantially the full length of the tracks, and their inwardly extending flanges are curved about the same center as the frame and the screen 13. However, as shown in Figure 24, the radius of the arc formed by the inwardly extending flanges of the angles 97 is less than the radius of the arc formed by the screen 13.

In Figure 25, I have illustrated diagrammatically the action of the bands 16. In that figure, the line 99 indicates the radius of curvature of the frame 47 and the line 100 indicates the radius of curvature of the bands 16 when they engages the angles 97. When the frame 47 is rocked across the bed 46, the carrier 48 causes it to follow the arc into which it has been formed. The carrier, however, permits the frame to move lengthwise relative to the bed. The linear position of the frame 47 on the bed 46 is determined by the straps 16 which are secured to the ends of the bed and of the frame. Therefore, while the frame 47 moves across the bed along the arc into which it has been formed, it can only advance at the rate permitted by the straps and slides backwardly relative to the bed 46 an amount equal to the difference in the arc of the frame 47 and the arc of the bands 16. The radius of the arc formed by the angles 97 is adjusted so that the backward movement of the frame compensates for the thermal expansion of the screen.

Thermal expansion of the screen is, of course, uniformly distributed along the length of the screen. The amount of pull-back by the straps on the frame due to their curving about an arc having a radius different from the radius of the arc followed by the frame likewise is uniformly distributed along the path of travel of the frame and, therefore, the gradual increase in length of the screen due to thermal expansion is matched by a gradual pull-back of the frame by the straps.

My screen printing apparatus has important features which make it highly desirable for those printing posters, magazine covers, plastic and metal sheets, and any other material where one or more colors are used. Specifically, my apparatus makes possible a simple and easy printing of multicolored matter which does not require a wait for the printed matter to dry or does not require use of auxiliary equipment for drying and hardening the printed matter. Thus, my apparatus has a high rate of production while, at the same time, producing clear and distinct figures, designs, and letters. In addition, my apparatus has a rugged and simple structure which when combined with a suitable drive mechanism provides its users with an almost fully automatic operation. Furthermore, my apparatus is adapted for both off-contact printing and contact printing.

While certain preferred embodiments of my invention have been shown and described, it will be understood that it may be otherwise embodied within the scope of the appended claims.

I claim:

1. Screen printing apparatus comprising two members, one being a bed adapted for supporting stock to be printed and the other being a frame, a screen housed in said frame, said frame being mounted upon said bed and being so located thereupon that said screen is positioned for delivering a printing composition onto the stock, one of the two members being longitudinally curved and the other being substantially flat, the frame and the bed having guideways extending longitudinally thereof, the guideways of the curved member being longitudinally curved and having a curvature different from the curvature of said member and the guideways of the other member being substantially flat, a carrier mounted upon the guideways of said frame and said bed, said carrier being adapted to move back and forth along said guideways of said bed and said frame so that one member rocks upon the other member, and means mounted upon said carrier for forcing the printing composition through said screen onto said stock as said carrier travels along said guideways.

2. Screen printing apparatus comprising two members, one being a bed adapted for supporting stock to be printed and the other being a frame, a screen housed in said frame, a mounting for said frame upon said bed, said mounting having at least two bands between said bed and said frame, one band being located along one side of the apparatus and the other band along the opposite side of the apparatus, each band being diagonally disposed between the frame and the bed with one band on one side of the apparatus occupying one diagonal and the other band on the opposite side of the apparatus the other diagonal, each band having one end secured to said frame and the other end secured to said bed with the two ends of said two bands secured to said frame being arranged at opposite ends of said frame, said mounting for said frame upon said bed being such that said screen is positioned for delivering a printing composition onto the stock, one of the two members being longitudinally curved and the other being substantially flat, each of the frame and of the bed having guideways extending longitudinally thereof, the guideways of the curved member being longitudinally curved and the guideways of the other member being substantially flat, a carrier mounted upon the guideways of both said frame and said bed, said carrier being adapted to move back and forth along said guideways of both said bed and said frame so that one member rocks upon the other member, and means mounted upon said carrier for forcing the printing composition through said screen onto said stock as said carrier travels along said guideways.

3. Printing apparatus of claim 1 characterized by said apparatus having means for preventing said stock to be printed from sticking to said screen, said means being connected to said bed and to said frame and being adapted to engage said stock supported on said bed.

4. Printing apparatus of claim 1 characterized by said apparatus having driving means connected to said carrier for moving said carrier back and forth along said guideways.

5. Printing apparatus as described in claim 2 and having means for preventing said stock to be printed from sticking to said screen, said means comprising straps connected at one end to said bed and at the other end to said frame and extending over and along the edges of the stock and a cross strip extending across the bed above said straps and beneath said bands.

6. Printing apparatus as described in claim 2 and having driving means for moving said carrier, said driving means comprising a first lever pivotally secured at one of its ends to said carrier by a cross lever and pivotally mounted at its other end at a point away from the stationary member and adjacent the longitudinal center of the machine, a crank arm, and a second lever pivotally connecting the crank arm and the first lever and a motor for rotating the crank arm.

7. Screen printing apparatus comprising two members, one being a bed adapted for supporting stock to be printed and the other being a frame, a screen housed in said frame, said frame being mounted upon said bed and being so located thereupon that said screen is positioned for delivering a printing composition onto the stock, one of the two members being longitudinally curved and the other being substantially flat, the frame and the bed having guideways extending longitudinally thereof, the guideways of the curved member being longitudinally curved and the guideways of the other member being substantially flat, a carrier mounted upon the guideways of said frame and said bed, said carrier being adapted to move back and forth along said guideways of said bed and said frame so that one member rocks upon the other member, means for heating said screen, and means mounted upon said carrier for forcing the printing composition through said screen onto said stock as said carrier travels along said guideways.

8. Printing apparatus as described in claim 2, characterized by means for causing said bands to curve about an arc having the same center as said curved member but a radius different than the radius of the arc formed by said curved member when one of said members rocks and moves along the other member.

9. Printing apparatus as described in claim 2, in which said bed and stock supported thereon are curved and mounted in said curved member and in which there are means for causing said bands to curve about an arc having the same center as said curved stock but a radius greater than the radius of the arc formed by said curved stock when said flat member rocks and moves along the curved member.

10. Printing apparatus as described in claim 2, in which said screen is curved and mounted in said curved member and in which there are means for causing said bands to curve about an arc having the same center as said curved member but a radius less than the radius of the arc formed by said curved member when said curved member rocks and moves along the flat member.

References Cited in the file of this patent

UNITED STATES PATENTS

| | | |
|---|---|---|
| 1,815,021 | Bland | July 14, 1931 |
| 1,898,406 | Tate et al. | Feb. 21, 1933 |
| 2,105,572 | Williams | Jan. 18, 1938 |
| 2,196,678 | Klopfenstein | Apr. 9, 1940 |
| 2,731,912 | Welsh | Jan. 24, 1956 |
| 2,771,839 | Ragan | Nov. 27, 1956 |